United States Patent [19]
Sliger

[11] 3,973,729
[45] Aug. 10, 1976

[54] VENT VALVE ARRANGEMENT
[75] Inventor: Boyd P. Sliger, Concord, Tenn.
[73] Assignee: Robertshaw Controls Company, Richmond, Va.
[22] Filed: Feb. 20, 1975
[21] Appl. No.: 551,282

[52] U.S. Cl. .......................... 236/34.5; 437/533.11; 403/153; 403/274
[51] Int. Cl.² ............................................. F01P 7/16
[58] Field of Search ........................... 236/34, 34.5; 137/533.11, 533.13, 533.19; 403/153, 274; 29/157.1 R

[56] References Cited
UNITED STATES PATENTS

| | | | |
|---|---|---|---|
| 248,902 | 11/1881 | Whitman | 137/533.13 X |
| 899,462 | 9/1908 | Nelson | 137/533.11 X |
| 2,829,835 | 4/1958 | Branson | 236/34.5 |
| 3,068,029 | 12/1962 | Schwartz | 403/274 X |

FOREIGN PATENTS OR APPLICATIONS

| | | | |
|---|---|---|---|
| 1,169,723 | 5/1964 | Germany | 236/34 |
| 893,671 | 4/1962 | United Kingdom | 236/34 |
| 977,658 | 12/1964 | United Kingdom | 236/34 |

Primary Examiner—William E. Wayner
Assistant Examiner—William E. Tapolcai, Jr.
Attorney, Agent, or Firm—Candor, Candor & Tassone

[57] ABSTRACT

A vent valve arrangement for a thermostatically operated valve construction that has a valve member for opening and closing a valve seat in response to temperature sensed by a temperature responsive device that is interconnected to the valve member to move the same relative to the valve seat whereby the vent valve arrangement permits fluid flow through the valve seat when the valve seat is closed, the vent valve arrangement having a one-piece valve seat member provided with a valve seat opening and a chamber for containing a movable valve member therein with that movable valve member opening and closing the valve seat opening.

9 Claims, 6 Drawing Figures

VENT VALVE ARRANGEMENT

This invention relates to an improved vent valve arrangement and to a method of making the same.

It is well known that thermostatically operated valve constructions have been provided wherein each has a vent valve arrangement for permitting fluid flow through the valve seat of the thermostatically operated valve construction even though the valve seat is closed by its valve member, such vent valve arrangement sometimes being known as a "jiggle" pin arrangement. For example, see the U.S. patent to Branson, U.S. Pat. No. 2,829,835, wherein such a "jiggle" pin is disclosed.

It is a feature of this invention to provide an improved vent valve arrangement for such a thermostatically operated valve construction or the like.

In particular, this invention provides a vent valve arrangement for a thermostatically operated valve construction wherein the vent valve arrangement has a one-piece valve seat member provided with a valve seat opening and a chamber for containing a movable valve member therein. A movable valve member is disposed in the chamber of the valve seat member and is contained therein by the configuration of the valve seat member, the movable valve member opening and closing the valve seat opening.

Accordingly, it is an object of this invention to provide an improved vent valve arrangement having one or more of the novel features of this invention as set forth above or hereinafter shown or described.

Another object of this invention is to provide a method of making such a vent valve arrangement.

Other objects, uses and advantages of this invention are apparent from a reading of this description which proceeds with reference to the accompanying drawings forming a part thereof and wherein.

Figure 1:
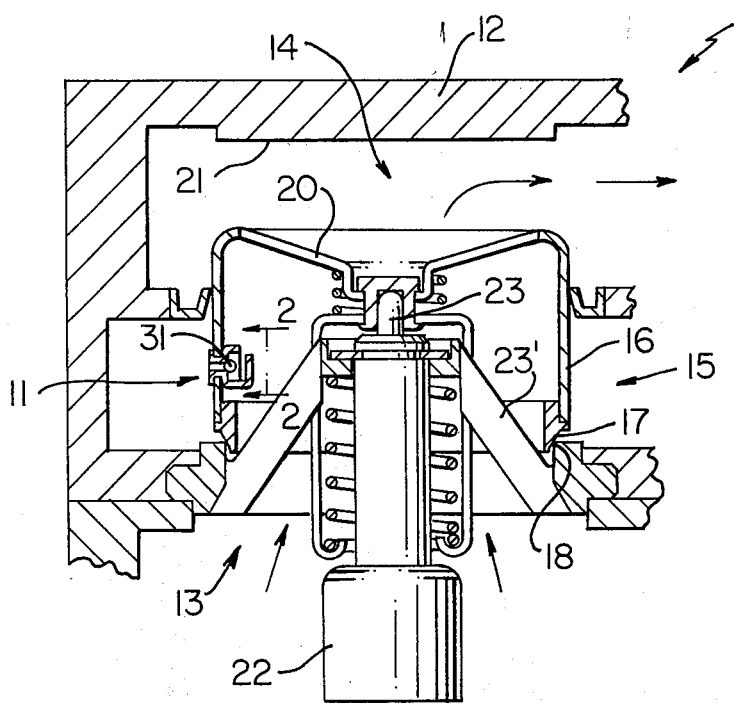
FIG. 1 is a fragmentary, cross-sectional view illustrating a thermostatically operated valve construction having the improved vent valve arrangement of this invention.
Figure 2:
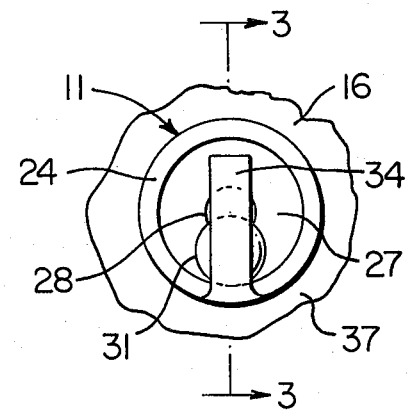
FIG. 2 is an enlarged, fragmentary view of the vent valve arrangement of FIG. 1 and is taken substantially in the direction of the arrows 2—2 of FIG. 1.

While the various features of this invention are hereinafter described and illustrated as being particularly adapted to provide a vent valve arrangement for a thermostatically operated valve construction, it is to be understood that various features of this invention can be utilized singly or in any combination thereof to provide a vent valve arrangement for other structures as desired.

Therefore, this invention is not to be limited to only the embodiment illustrated in the drawings, because the drawings are merely utilized to illustrate one of the wide variety of uses of this invention.

Referring now to FIG. 1, a thermostatically operated valve construction is generally indicated by the reference numeral 10 and has the improved vent valve arrangement of this invention that is generally indicated by the reference numeral 11, the thermostatically operated valve construction 10 being mounted in a housing means 12 that comprises an engine coolant system wherein coolant fluid from the engine is directed to a chamber 13 that is adapted to be interconnected by the thermostatically operated valve construction 10 either to a bypass chamber 14 that leads back to the inlet of the water pump of the engine or to a chamber 15 that leads to the radiator of the engine or provides for causing a portion of the flow of the coolant from the engine chamber 13 to the bypass chamber 14 and the remaining portion thereof to the radiator chamber 15 in a manner well known in the art. For example, see the U.S. patents to Wagner, U.S. Pat. Nos. 2,919,860 and 3,734,405 for a description of the operation of such a valve construction 10.

The particular thermostatically operated valve construction 10 illustrated in FIG. 1 of this application comprises the subject matter of a concurrently filed patent application that is assigned to the same assignee to whom this application is assigned, such application being designated as Robertshaw Controls Company Docket No. 2589-FS.

The thermostatically operated valve construction 10 includes a movable sleeve valve member 16 that has an end 17 for opening and closing a valve seat 18 that leads from the engine chamber 13 to the radiator chamber 15, the sleeve valve member 16 having an open upper end 20 that is adapted to direct the coolant flow that passes through the closed valve seat 18 to the bypass chamber 14 unless the open end 20 of the sleeve valve member 16 is moved against a surface 21 of the housing 12 to completely close the open end 20 thereof so that the entire flow through the valve seat 18 will be directed to the radiator chamber 15 for the reasons fully set forth in the aforementioned U.S. patents to Wagner.

A power element or condition responsive member 22 is carried by a supporting structure 23 of the valve seat 18 and has a movable piston 23 interconnected to the valve member 16 for moving the same relative to the valve seat 18 in response to the temperature of the coolant in the chamber 13 being sensed by the unit 22.

The vent valve arrangement 11 of this invention provides an opening from the chamber 13 to the chamber 15 when the valve member 16 is closing the valve seat 18 and the engine is not running so that should coolant fluid be added to the system, the air from the chamber 13 can escape through the open vent valve arrangement 11 to the radiator chamber 15. However, once the engine is started and the coolant begins to flow from the chamber 13 to the chamber 14 when the valve member 16 is in the closed position illustrated in FIG. 1, the flow of water or coolant causes the vent valve arrangement 11 to close as will be apparent hereinafter so that no coolant can escape to the radiator chamber 15 when the valve member 16 is closed against the valve seat 18.

The vent valve arrangement 11 comprises a one-piece valve seat member 24 that is substantially tubular and has a cylindrical reduced portion 25 interconnected to a non-reduced cylindrical portion 26 in such a manner that the juncture 27 between the portions 25 and 26 defines a valve seat opening 28 inside the valve seat member 24.

Figure 4:
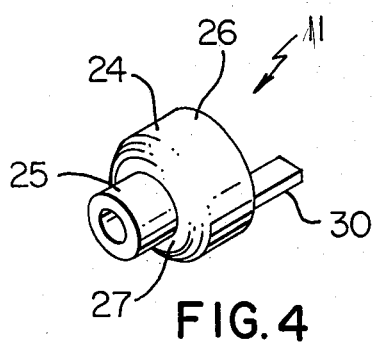
FIG. 4 is a reduced perspective view illustrating the one-piece valve seat member of the vent valve arrangement of this invention before the same has been formed into its completed configuration.
Figure 5:
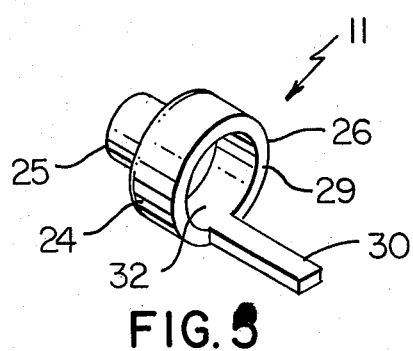
FIG. 5 is a view similar to FIG. 4 and illustrates the one-piece valve seat member in the opposite direction of FIG. 4.
Figure 6:
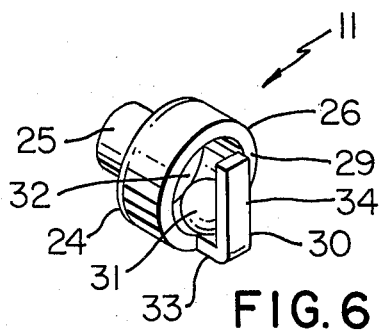
FIG. 6 is a view similar to FIG. 5 and illustrates the vent valve arrangement in its completed configuration.

The non-reduced portion 26 of the one piece valve seat member 24 has an open end 29 spaced from the valve seat opening 28 and is provided with an integral tang or extension 30 normally formed in the configuration illustrated in FIGS. 4 and 5 so that a ball valve member 31 can be readily disposed in the open end 29 of the non-reduced portion 26 to be received in the chamber 32 thereof and thereafter be contained within that chamber 32 by the tang 30 subsequently being bent in an L-shaped configuration so that one leg 33 thereof still extends beyond the open end 29 of the non-reduced portion 26 while the other leg 34 thereof is disposed at a right angle across the open end 29 in spaced relation relative thereto so that the ball valve member 31 is completely contained within the chamber 32 by the L-shaped tang 30 in the manner illustrated in FIGS. 3 and 6 and can not fall out of the end 29 thereof.

The reduced portion 25 of the one-piece valve seat member 24 is adapted to be inserted through a cylindrical opening 35 of the sidewall of the sleeve valve member 16 and have a portion 36 thereof project beyond the same while the juncture 27 of the valve seat member 24 abuts against the inside surfce 37 of the wall 16. Thereafter, the projecting portion 36 of the reduced portion 25 is staked over against the outside surface 38 of the wall 16 to fasten the valve seat member 24 thereto in the manner illustrated in FIG. 3 whereby a relatively inexpensive vent valve arrangement 11 is provided for the valve member 16 of the thermostatically operated valve construction 10 to be operated in a manner now to be described.

Figure 3:
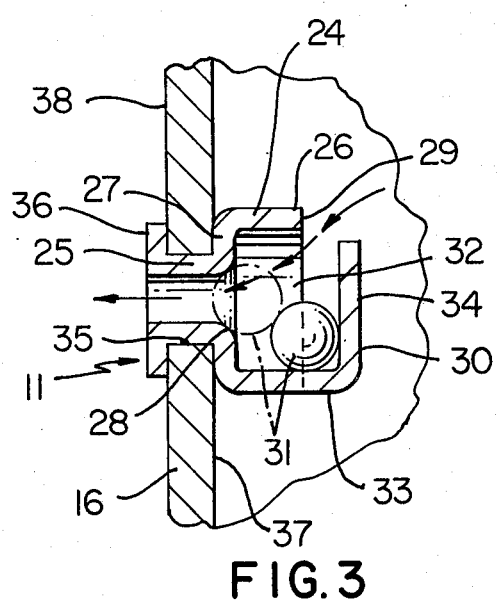
FIG. 3 is a cross-sectional view taken on line 3—3 of FIG. 2.

As previously stated, when the sleeve valve member 16 is in a closed position against the valve seat 18 and the engine is not running, there is no coolant pressure in the chamber 13 so that the ball valve member 31 falls by gravity from the position illustrated by dash-dotted lines in FIGS. 3 to the full line position to be contained in the chamber 32 of the one-piece valve seat member 24 but in a manner to fully open the valve seat opening 28 so that air can pass through the vent valve arrangement 11 should coolant fluid be added to the housing 12 and thereby create an air flow from the chamber 13.

However, when the engine is running and the valve member 16 is closed against the valve seat 18 so that the entire flow of coolant flows from the chamber 13 through the open end 20 of the valve member 16 to the bypass chamber 14, such flow of fluid engages against the ball valve member 31 at the part thereof that overhangs the end 29 of the tubular portion 26 as permitted by the leg 33 of the tang 30 and causes the ball valve member 31 to move to the dash-dotted line position of FIG. 3 to completely close the valve seat opening 28 and thereby prevent the coolant from flowing from the chamber 13 to the radiator chamber 15 as it is desired to have the entire amount of coolant flow to the bypass chamber 14 at this time.

Therefore, it can be seen that the vent valve arrangement 11 of this invention provides a simple and effective assembly for providing a vent arrangement for the thermostatically operated valve construction 10, the vent valve arrangement 11 of this invention not only being relatively inexpensive, but also being relatively simple to manufacture and secure in place.

Therefore, this invention not only provides an improved vent valve arrangement, but also this invention provides an improved method of making the same.

While the form and method of this invention now preferred have been described and illustrated as required by the Patent Statute, it is to be understood that other forms and method steps can be utilized and still come within the scope of the appended claims.

What is claimed is:

1. In a thermostatically operated valve construction having a valve member for opening and closing a valve seat in response to temperature sensed by a temperature responsive device that is interconnected to said valve member to move the same relative to said valve seat and having a vent valve arrangement for permitting fluid flow through said valve seat when said valve seat is closed by said valve member, the improvement wherein said vent valve arrangement has a one-piece valve seat member provided with a valve seat opening and a chamber for containing a movable valve member therein, and a movable valve member of said vent valve arrangement being contained in said chamber by the configuration of said one-piece valve seat member for opening and closing said valve seat opening, said one-piece valve seat member having an open end spaced from said valve seat opening, said one-piece valve seat member having a single integral tab extension thereof disposed adjacent said open end to contain said valve member of said vent valve arrangement in said chamber, said integral tab extension being bent into substantially an L-shaped configuration with one leg thereof being an extension of said open end and the other leg thereof being disposed in front of and spaced outwardly from said open end.

2. In a thermostatically operated valve construction as set forth in claim 1, said one-piece valve seat member of said vent valve arrangement comprising a tubular member having a reduced portion defining said valve seat opening thereof at the juncture with a non-reduced portion thereof.

3. In a thermostatically operated valve construction as set forth in claim 2, said non-reduced portion of said one-piece valve seat member defining said chamber.

4. In a thermostatically operated valve construction having a valve member for opening and closing a valve seat in response to temperature sensed by a temperature responsive device that is interconnected to said valve member to move the same relative to said valve seat and having a vent valve arrangement for permitting fluid flow through said valve seat when said valve seat is closed by said valve member, the improvement wherein said vent valve arrangement has a one-piece valve seat member provided with a valve seat opening and a chamber for containing a movable valve member therein, and a movable valve member of said vent valve arrangement being contained in said chamber by the configuration of said one-piece valve seat member for opening and closing said valve seat opening, said one-piece valve seat member of said vent valve arrangement comprising a tubular member having a reduced portion defining said valve seat opening thereof at the juncture with a non-reduced portion thereof, said non-reduced portion of said one-piece valve seat member defining said chamber, said non-reduced portion of said one-piece valve seat member having an open end spaced from said valve seat opening, said non-reduced portion having a single integral tab extension thereof disposed adjacent said open end to contain said valve member of said vent valve arrangement in said chamber, said integral tab extension being bent into substantially an L-shaped configuration with one leg thereof being an extension of said reduced portion and the other leg thereof being disposed in front of and spaced outwardly from said open end.

5. In a thermostatically operated valve construction as set forth in claim 4, said valve member of said vent valve arrangement being a ball valve member.

6. In a thermostatically operated valve construction as set forth in claim 5, said reduced portion of said one-piece valve seat member having an open end spaced from said valve seat opening, said open end of said reduced portion securing said one-piece valve seat member to said construction.

7. In a thermostatically operated valve construction as set forth in claim 6, said valve construction having a wall provided with an opening passing therethrough, said open end of said reduced portion of said one-piece valve seat member projecting through said opening of said wall.

8. In a thermostatically operated valve construction as set forth in claim 7, said open end of said reduced portion of said one-piece valve seat member being staked to said wall whereby said wall is trapped between said staked open end and said non-reduced portion of said one-piece valve seat member.

9. In a thermostatically operated valve construction as set forth in claim 8, said wall comprising said valve member that controls said valve seat.

\* \* \* \* \*